United States Patent [19]
McIntyre, Jr. et al.

[11] Patent Number: 6,085,261
[45] Date of Patent: Jul. 4, 2000

[54] METHOD AND APPARATUS FOR BURST PROTOCOL IN A DATA PROCESSING SYSTEM

[75] Inventors: Kenneth L. McIntyre, Jr., Dripping Springs; Kirk Livingston, Austin; Daniel W. Pechonis, Austin; Anthony M. Reipold, Austin, all of Tex.

[73] Assignee: Motorola, Inc., Schaumburg, Ill.

[21] Appl. No.: 08/690,463

[22] Filed: Jul. 29, 1996

[51] Int. Cl.[7] .................................................. G06F 13/28
[52] U.S. Cl. ................................ 710/35; 710/32; 709/209
[58] Field of Search ................................... 395/290, 855, 395/307, 287, 200.39, 852; 711/154, 157, 169

[56] References Cited

U.S. PATENT DOCUMENTS

| | | | |
|---|---|---|---|
| 4,602,327 | 7/1986 | LaViolette et al. | 364/200 |
| 4,751,632 | 6/1988 | Mothersole et al. | 364/200 |
| 4,799,199 | 1/1989 | Scales, III et al. | 365/230 |
| 5,651,138 | 7/1997 | Le et al. | 711/154 |
| 5,689,659 | 11/1997 | Tietjen et al. | 395/307 |
| 5,699,516 | 12/1997 | Sapir | 395/290 |
| 5,757,703 | 5/1998 | Merritt et al. | 365/189.05 |
| 5,768,622 | 6/1998 | Lory et al. | 395/855 |

*Primary Examiner*—Parshotam S. Lall
*Assistant Examiner*—Khanh Quang Dinh
*Attorney, Agent, or Firm*—Susan C. Hill

[57] ABSTRACT

A data processing system (10) capable of burst transfers having an external bus interface (30) which allows termination of a burst transfer prior to completion of the burst transaction. The present invention offers a method of terminating a burst transaction without the addition of wait states, and further allows termination to effectively interrupt the burst transaction rather than waiting for burst completion. In one embodiment, on the negation of a burst request signal during a burst transfer, external bus interface (30) terminates the burst transfer without waiting for the completion of the burst transaction.

15 Claims, 5 Drawing Sheets

MASTER TERMINATION OF BURST-TIMING EXAMPLE
(NOTE: DTACK NOT APPLIED IN THIS CASE.)

SLAVE TERMINATION OF BURST-TIMING EXAMPLE
(WITH INSERTED WAIT STATES)

METHOD AND APPARATUS FOR BURST PROTOCOL IN A DATA PROCESSING SYSTEM

REFERENCE TO RELATED APPLICATIONS

The present application is related to the following U.S. patent applications:

"Method and Apparatus for Bursting Operand Transfers During Dynamic Bus Sizing", invented by Donald L. Tietjen, et al., Ser. No. 08/550,043, U.S. Pat. No. 5,689,659 filed Oct. 30, 1995 and assigned to the assignee hereof; and "Method and Apparatus for Providing Valid Addresses Across a Multiplexed Communication Bus", invented by Donald L. Tietjen, et al., Ser. No. 08/550,311, U.S. Pat. No. 5,649,125 filed Oct. 30, 1995, and assigned to the assignee hereof.

FIELD OF THE INVENTION

The present invention relates in general to a data processing system, and more particularly to bus protocol in a data processor.

BACKGROUND OF THE INVENTION

Many data processing systems use local memory storage methods to store frequently used instructions and data. Local storage allows the data processor to minimize time consuming accesses to external devices. Two common methods of local storage include use of an associative cache and use of a pre-fetch type instruction queue.

The amount of information to be stored to local memory increases with software complexity. Burst transactions allow multiple transfers in response to a single address prompt, and thus reduce access time. Bursting is often used for transferring information to local memory as it is an efficient way of further enhancing the performance of a data processing system. Known bursting schemes perform bursts of up to 256 transfers per burst transaction. As the complexity of data processing systems increases, there is a need for increased transfer capability.

To transfer information to a local memory, the data processor indicates an initial address; the transfer begins at that initial address and is performed independently of the data processor operation. The data processor is free to perform other functions (i.e. process instructions) while the local memory is filling. As the data processor processes instructions it may need to branch to an address which has not been stored in local memory. Ideally, no further information is transferred from the current memory location and transfer begins at the jump address provided by the data processor. For non burst type transactions, the termination is possible after each data transfer. However, if the transfer is a burst transaction there may be significant delay or latency due to the time necessary for completion of the burst. For example, with a modular type data processing system, which resets at the end of the bus cycle, there is no capacity to efficiently terminate a potentially infinite length burst.

Additionally burst type protocols are typically associated with complex systems, where a secure handshake across a backplane and multiple masters require multiple transfers or clocks to terminate a burst transaction. Some protocols do not allow a slave to terminate once a burst transaction has begun. Burst protocols which provide for termination of unwanted words in a cache line are initiated by the master but have an associated latency.

Data processing systems which utilize local memory storage techniques or perform burst type transactions require additional flexibility for dynamic response to the needs of the system. Efficient system operation considers reduced latency associated with burst transfer termination, while increasing the availability of termination methods.

DESCRIPTION OF THE PREFERRED EMBODIMENT

According to the present invention a data processing system having a bus interface unit and an external bus interface (EBI) allows termination of a burst transfer prior to completion of the burst transaction. The present invention offers a method of terminating a burst transaction without the addition of wait states, and further allows termination to effectively interrupt the burst transaction rather than waiting for burst completion.

In one embodiment of the present invention a data processing system bus master or bus interface unit initiates a burst transaction by asserting a burst request signal (BREQ) and a slave device confirms transmission of each data transfer by asserting a burst acknowledge signal (BTACK) and confirms the end of the burst transaction by asserting a data acknowledge signal (DTACK.) The master may terminate the burst early by negating BREQ whereupon the burst transaction will terminate on the next data transfer. A slave also has capacity to terminate the burst transaction by asserting DTACK.

In one embodiment of the present invention a burst transaction is converted to a non burst transaction when a bus master negates BREQ prior to the slave's initial assertion of BTACK.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. A signal may be preceded by an exclamation point (!) which denotes negation of the signal.

DETAILED DESCRIPTION OF THE PREFERRED EMBODIMENTS

Figure 1:
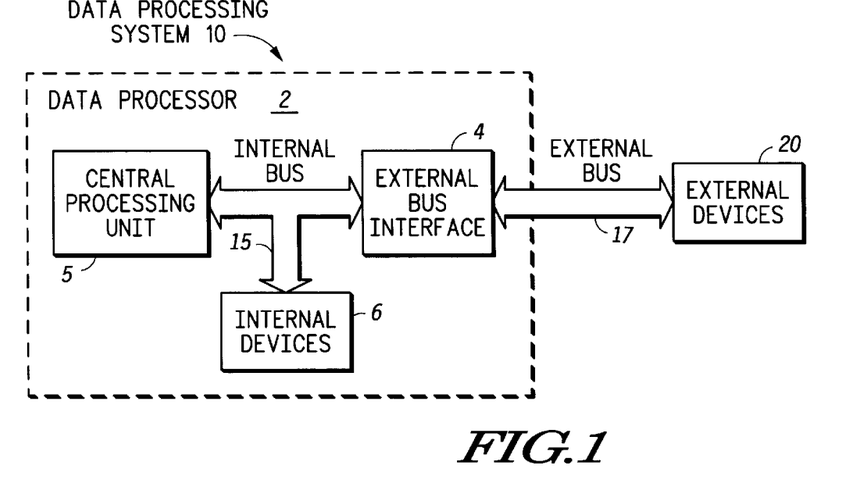
FIG. 1 illustrates in block diagram form a data processing system according to the present invention.

The present invention can be more fully understood with reference to FIGS. 1 through 7. FIG. 1 illustrates data processing system 10 having data processor 2 which includes a central processing unit (CPU) 5, internal devices 6, and external bus interface (EBI) 4, which are all bi-directionally coupled to internal bus 15. EBI 4 is optionally coupled external to data processing system 10 to external devices 20 by way of external bus 17. EBI 4 responds to requests from CPU 5 and interfaces with external devices 20.

Figure 2:
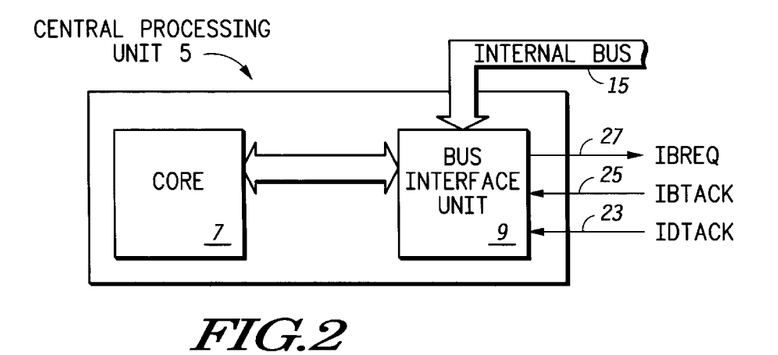
FIG. 2 illustrates in block diagram form a portion of the central processing unit of FIG. 1.

FIG. 2 illustrates one embodiment of CPU 5 which includes core 7 and bus interface unit 9, which are bi-directionally coupled by an multiple conductor bus. Bus interface unit 9 is further coupled to internal bus 15. Bus interface unit 9 receives an internal burst acknowledge signal (IBTACK) on conductor 25 and an internal data acknowledge signal (IDTACK) on conductor 23. Bus interface unit 9 generates an internal burst request signal (IBREQ) on conductor 27; assertion of IBREQ on conductor 27 indicates that CPU 5 requests a burst transaction. Alternate embodiments may implement any number of conductors for burst signals.

Figure 3:
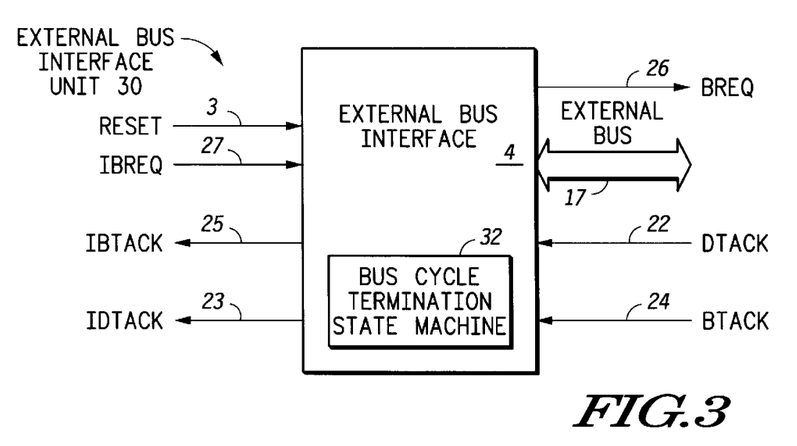
FIG. 3 illustrates in block diagram form the external bus interface unit of FIG. 1.

Bus interface unit 9 communicates with EBI 4 by way of internal bus 15 and conductors (23, 25, 27), as illustrated in FIG. 3. Referring to FIG. 3, EBI 4 includes bus cycle termination state machine 32. EBI 4 receives a data acknowledge (DTACK) signal and a burst acknowledge signal (BTACK) on conductors 22 and 24 respectively. EBI 4 provides a burst request (BREQ) signal on conductor 26. Note that signals DTACK, BTACK, and BREQ are included in external bus 17, but are distinguished in FIG. 3 for clarity. Based on the timing of inputs (22, 24, 27) bus cycle termination state machine 32 effectively initiates and terminates each burst transaction.

EBI 4 functions as a bus master based on the operation of data processing system 10. As a bus master, EBI 4 allows internal bus cycles to access external resources. Generally, EBI 4 provides support to any number of alternate external masters. In one embodiment of the present invention, EBI 4 supports variable length external bus cycles, thus accommodating a variety of access speeds associated with external devices 20.

In one embodiment of the present invention, during a burst transaction EBI 4 provides the address of a first data item on external bus 17, and in response one of external devices 20 acknowledges each data transfer with a BTACK signal. Data transfers continue with EBI 4 providing any necessary wait states until assertion of a DTACK signal. Conventionally, a BTACK signal is both an indication that a device supports burst protocol and that a device is ready to transfer burst data. To support low latency bus operation, which is critical to microprocessor operation, the present invention allows CPU 5 to terminate a burst cycle by negation of IBREQ signal via EBI 4, and also allows external devices 20 to terminate a burst cycle by assertion of DTACK signal.

Further, in one embodiment of the present invention, EBI 4 receives a RESET signal on conductor 3. If a RESET is pending, EBI 4 assertion of the DTACK signal on the next BTACK signal terminates burst transactions which transfer data from external devices 20 to data processor 2. Here bus latency is reduced as the burst transaction is terminated on the next data transfer without waiting for burst completion. In one embodiment of the present invention, data processing system 10 is capable of effecting unlimited burst transactions, where the reduction in latency is significant. However, burst cycle transfers from data processor 2 to external devices 20 are allowed to complete without EBI 4 interference. Note that write transfers are from data processor 2, whereas read transfers are to data processor 2.

Conventionally data processing systems with burst capability, define the burst according to data width and burst length. Data width is the number of bits of data processed in each data transfer and burst length is the total amount of data transferred, represented either as the total number of transfers or the combined total of data. Complex systems require a large amount of memory, which is often stored external to the data processor in external memories. Data processor operating speed may then be limited by the speed of access to external devices. Internal memory storage methods such as cache and pre-fetch type architectures, seek to transfer data that will be accessed repeatedly to temporary storage in the data processor. This allows CPU 5 to access information from external devices 20 in an efficient way, without waiting for an external access each time.

Cache type storage methods predict the data that CPU 5 will require, and while CPU 5 is processing instructions EBI 4 transfers the information to internal memory. As CPU 5 proceeds, CPU 5 may process a branch or a jump type instruction, requiring data from another memory region. At this point CPU 5 decides to terminate the burst transaction. The present invention allows data processing system 10 to stop a burst transaction in process without a multiple clock penalty. Additionally, in one embodiment of the present invention, CPU 5 converts a burst cycle to a non burst cycle without a performance penalty by negating the IBREQ signal via EBI 4 before the first data transfer of one of external devices 20.

Figure 4:
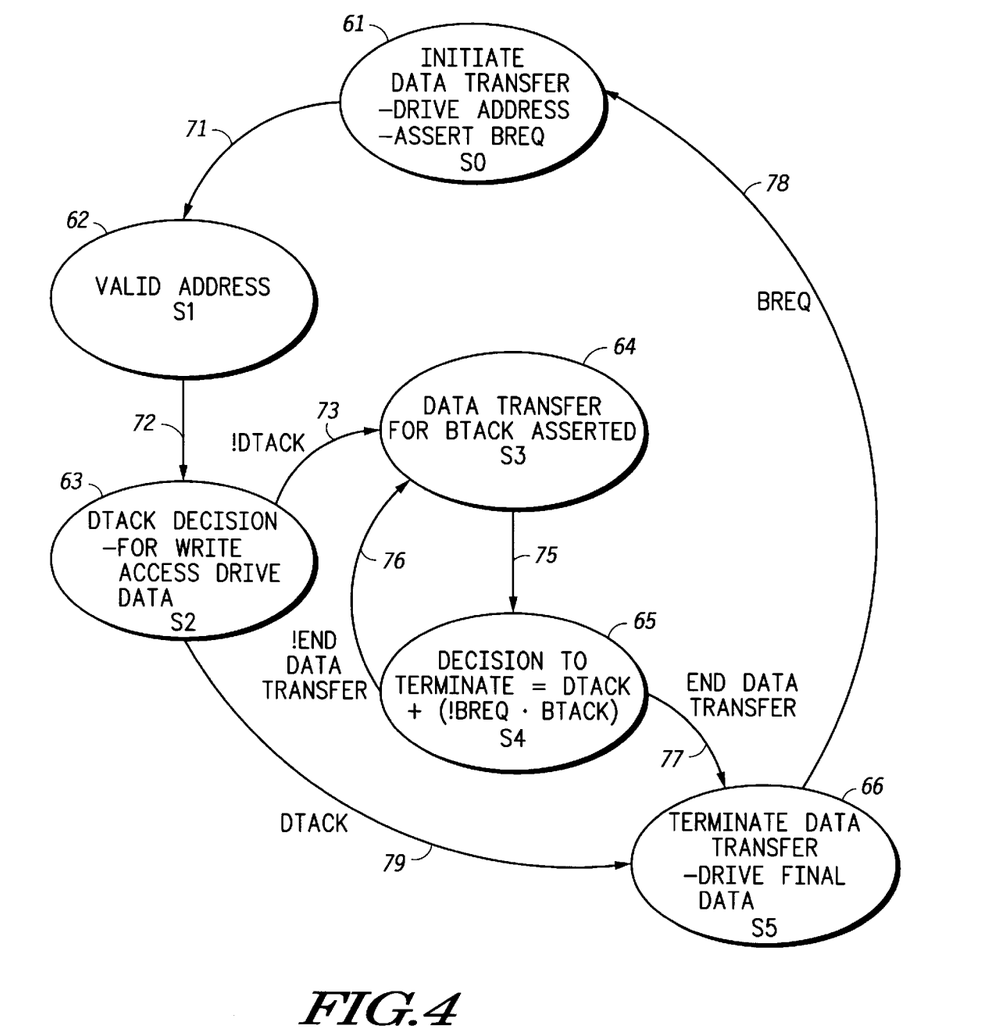
FIG. 4 illustrates a state diagram of the bus cycle termination state machine of FIG. 3.

FIG. 4 illustrates a state diagram of bus cycle termination state machine 32 of FIG. 3 for one embodiment of the present invention. Bus cycle termination state machine 32 is capable of assuming one of six states 61, 62, 63, 64, 65, and 66. In initial data transfer state S0 61 EBI 4 drives address and function code information, and asserts BREQ in response to a burst request from CPU 5. Bus cycle termination state machine 32 then makes transition 71 to valid address state S1 62, where address is valid on external bus 17. External devices 20 may assert the DTACK signal during state S1 62, which will convert a burst cycle to a two clock non burst cycle with state sequence S0 61, S1 62, S2 6, S5 66.

After transition 72 to DTACK decision state S2 63 a decision is made based on the acknowledge signal of external devices 20. For external devices 20, assertion of DTACK signal transition 79 is made to terminate data transfer state S5 66. BTACK signal assertion while bus cycle termination state machine 32 is in state S2 63 indicates that burst data is to be transferred in data transfer state S3 64. Note that negation of IBREQ signal by CPU 5 during state S2 63 will convert the burst cycle to a non burst cycle (i.e. standard cycle.) Note also that if the transfer is a write, data is driven on the data bus during state S2 63.

Bus cycle termination state machine 32 makes transition 73 when DTACK signal is not asserted during state S2 63 and moves to state S3 64. Bus cycle termination state machine 32 makes transition 79 when DTACK signal is asserted during state S2 63 and moves to state S5 66. For burst transfers (i.e. BTACK signal asserted previously) burst data is provided during state S3 64. For a read transfer EBI 4 latches data. Bus cycle termination state machine 32 makes transition 75 to decision to terminate state S4 65, represented by the decision to continue the burst or terminate. CPU 5 may terminate the burst cycle by negating IBREQ signal. Note that in some embodiments of the present invention, a slave may terminate by asserting DTACK. If IBREQ is asserted and DTACK is negated in state S4 65 bus cycle termination state machine 32 will make transition 76 back to state S3 64 and continue the burst transaction. Note that transition 76 is only taken if the transaction is not complete.

Figure 6:
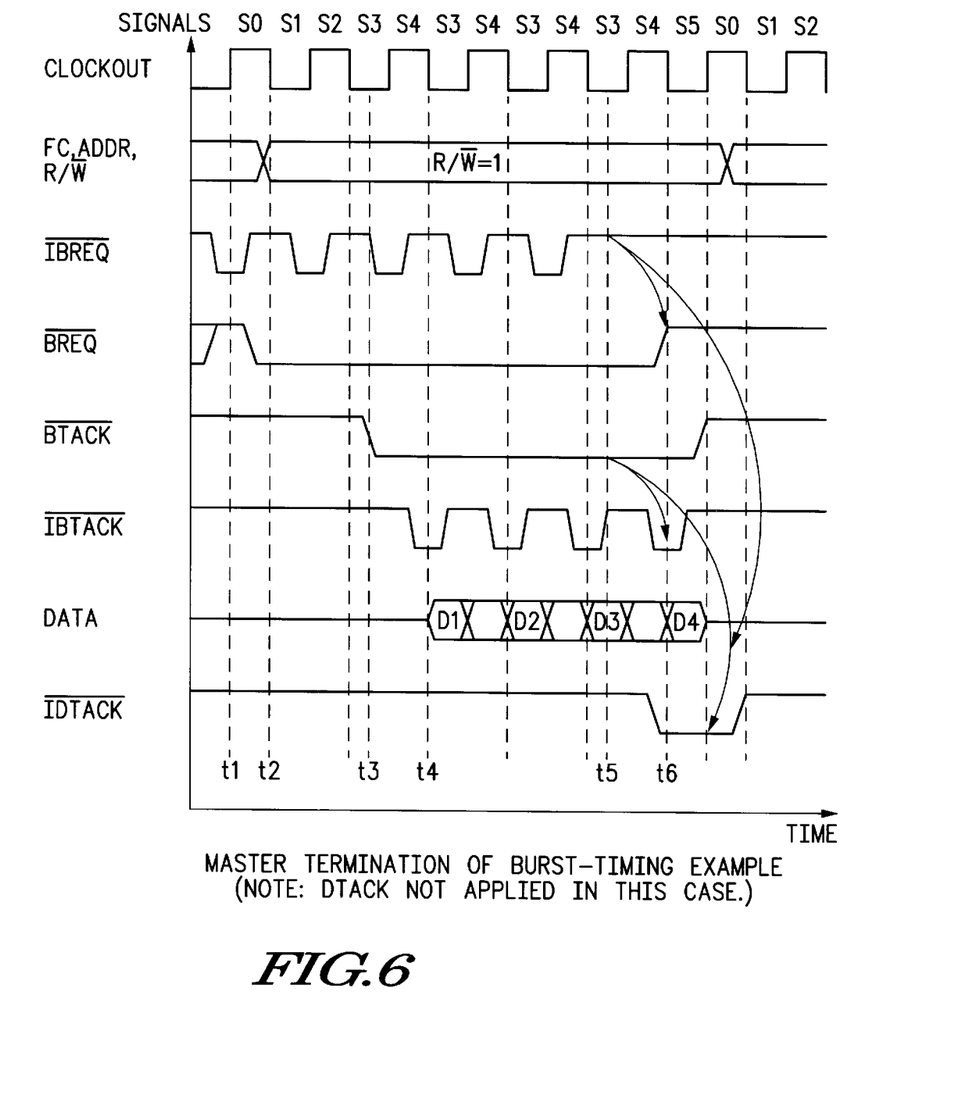
FIG. 6 illustrates a timing diagram useful in understanding the operation of the data processing system of FIG. 1.
Figure 7:
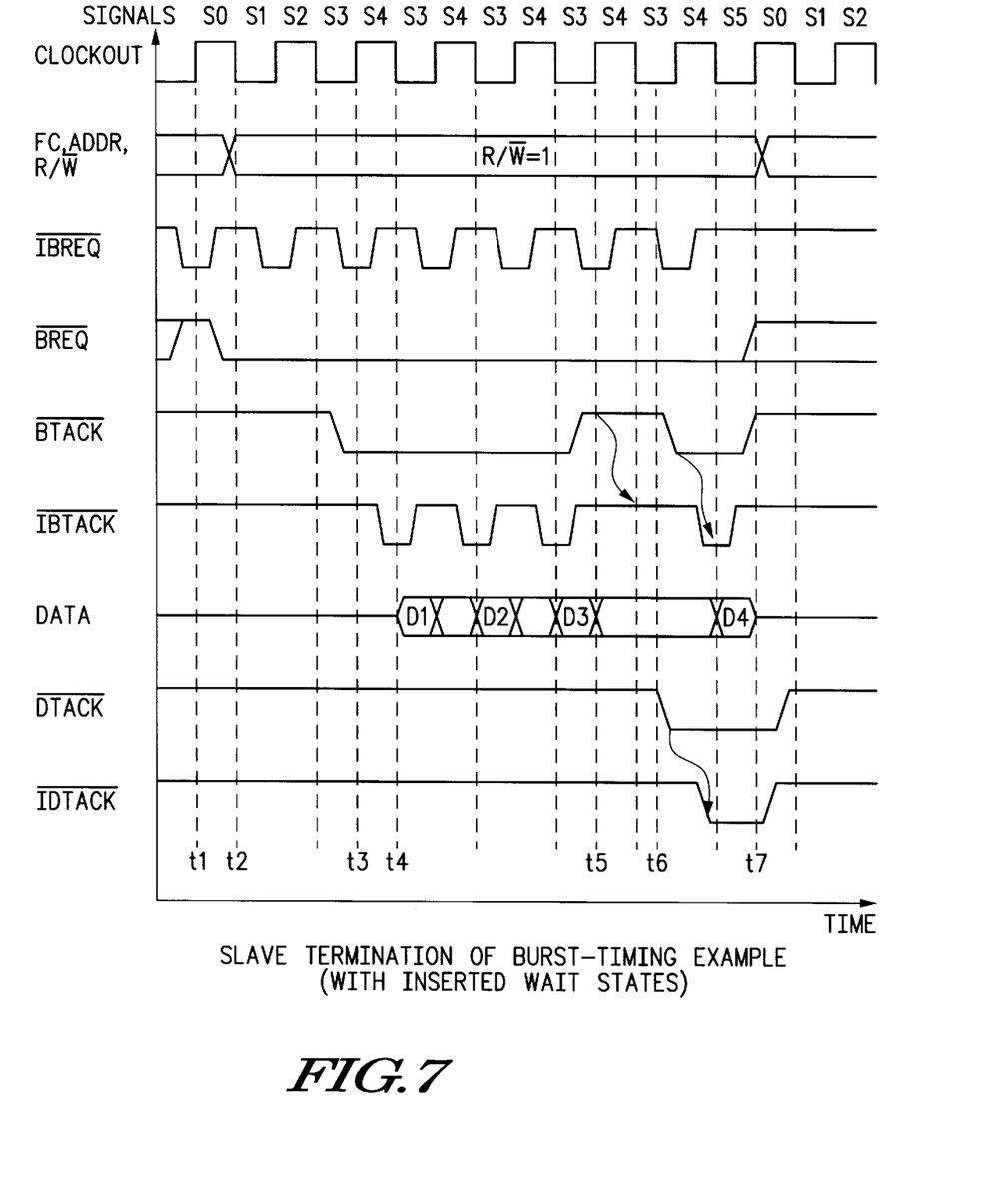
FIG. 7 illustrates a timing diagram useful in understanding the operation of the data processing system of FIG. 1.

For end of cycle transition 77, IBREQ is negated or DTACK is asserted and bus cycle termination state machine 32 goes to state S5 66. At the beginning of state S5 66 the final data is provided. For a read transfer in state S5 66, EBI 4 latches data. The next transaction will again begin in state S0 61. External devices 20 negates DTACK, BTACK and data during state 5 66 and the following state S0 61. The burst waveforms illustrated in FIGS. 6 and 7 are of two burst cycle scenarios.

Figure 5:
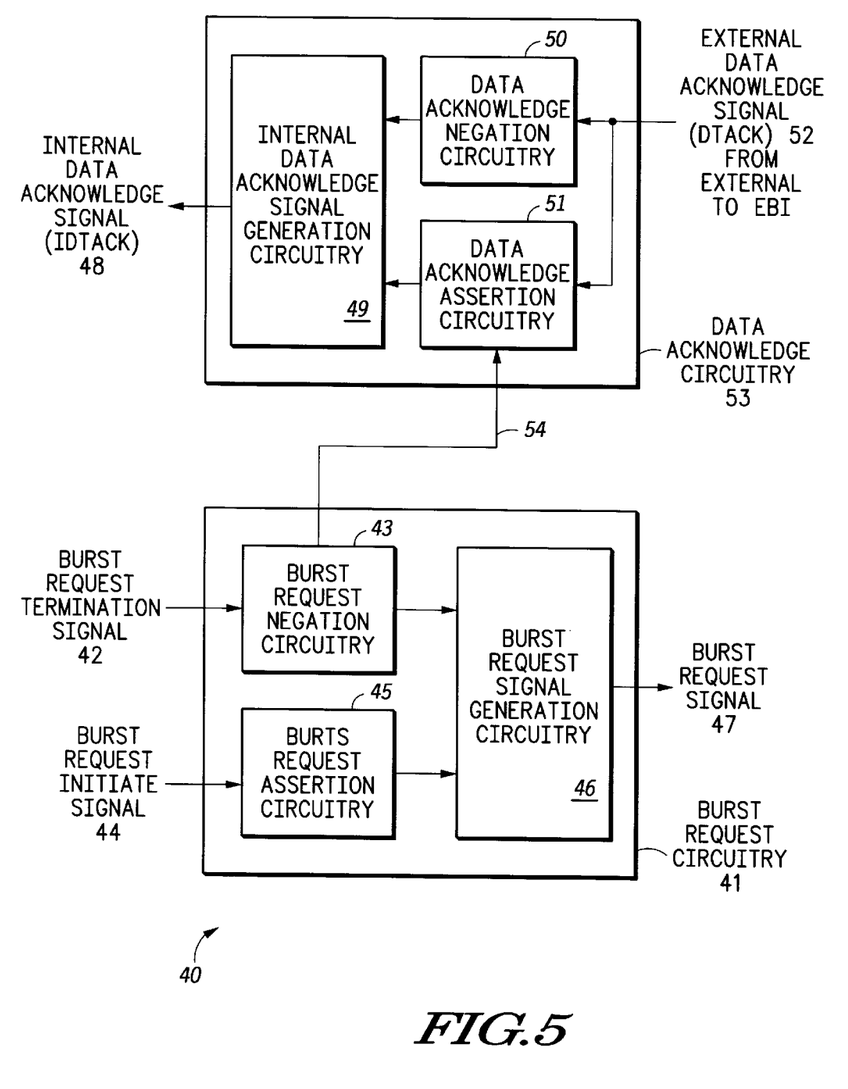
FIG. 5 illustrates in block diagram form a portion of bus cycle termination state machine of FIG. 3.

FIG. 5 offers a detailed look at one embodiment of bus cycle termination state machine 32 of FIG. 3, where portion 40 of bus cycle termination state machine 32 contains signal generation circuitry. Data acknowledge circuitry 53 contains DTACK negation circuitry, DTACK assertion circuitry 51, and internal DTACK signal (IDTACK) generation circuitry 49. DTACK negation circuitry 50 receives a DTACK signal from external to EBI 4 on conductor 52. In one example, a DTACK signal is received from external devices 20 on conductor 52. DTACK assertion circuitry 51 receives a DTACK signal from external to EBI 4 on conductor 52 and receives a IDTACK assert signal from burst request circuitry 41 on conductor 54. DTACK negation circuitry 50 and DTACK assertion circuitry are coupled to IDTACK signal generation circuitry 49. In response to inputs from DTACK negation circuitry 50 and DTACK assertion circuitry 51, IDTACK signal generation circuitry 49 generates IDTACK signal on conductor 48.

Continuing with FIG. 5, burst request circuitry 41 contains burst request (BREQ) negation circuitry 43 and burst request assertion circuitry 45, coupled to burst request signal generation circuitry 46. BREQ negation circuitry receives burst request termination signal on conductor 42 and is coupled to DTACK assertion circuitry via conductor 54. BREQ negation circuitry 43 and BREQ assertion circuitry 45 are each coupled to burst request signal generation circuitry 46, which generates BREQ signal on conductor 47. In an alternate embodiment, at least one of conductors (47, 42, 44, 48, 52, 54) represents multiple conductors. In an alternate embodiment, at least one of conductors (47, 42, 44, 48, 52, 54) represents a bidirectional conductor.

A master initiates a burst transfer during state S0 61 by driving address and asserting BREQ signal on external bus 17. BREQ assertion circuitry 45 receives a BREQ initiate signal on conductor 44 and informs BREQ signal generation circuitry 46, which then asserts BREQ signal on conductor 47. The burst transaction then proceeds and data transfers begin.

For master termination of a burst transaction after initiation but before completion, BREQ negation circuitry 43 receives BREQ termination signal on conductor 42 indicating a burst termination. In response to information from BREQ negation circuitry 43, BREQ signal generation circuitry 46 negates BREQ signal on conductor 47. DTACK assertion circuitry 51 also receives information from BREQ negation circuitry 43 to assert IDTACK signal. In response, IDTACK signal generation circuitry 49 asserts IDTACK signal on conductor 48.

For slave termination of a processing burst transaction prior to completion, a slave, for example external devices 20, will assert DTACK signal on conductor 52. DTACK assertion circuitry 51 receives the slave's DTACK signal and informs IDTACK signal generation circuitry 49 to assert IDTACK on conductor 48 terminating the current burst transaction.

Starting with FIG. 6, bus cycle termination state machine 32 states from FIG. 4 define each cycle of a burst transaction. In one embodiment of the present invention, cycle transitions are driven by a clock signal and process according to the state diagram of FIG. 4. External bus 17 is used to transfer address information, data information, function code type information (FC), and transfer direction information, as well as burst control signals such as BTACK and BREQ. Note that in one embodiment of the present invention, burst size and data size are programmable. Other information is provided on external bus 17 which is conventional to burst transactions, however for clarity only a few signals are illustrated in FIGS. 6 and 7. The transaction illustrated in FIG. 6 is a read transfer of data. IBREQ signal is provided by CPU 5. The BREQ signal is an active low signal provided by EBI 4 and available on external bus 17. Bus cycle termination state machine then makes transition 78 state S0 61 to start the next burst transaction. In one embodiment of the present invention, address, function code information, data direction signals, BREQ, and other conventional data transfer signals remain active throughout state S5 66 to allow static memory operation and signal skew. Slave devices typically negate acknowledge signals and data before the end of the next state S0 61.

FIG. 6 is one example of the timing associated with a master termination of a processing burst transaction for one embodiment of the present invention. Though some existing burst protocols allow master termination, the methods add lead time, requiring multiple clocks to stop the burst. The present invention allows a master to terminate a burst without time penalty using existing burst transaction signals. The corresponding states described by bus cycle termination state machine 32 are indicated across the top. The states are as illustrated in FIG. 4. A clock signal, FC and address information, data direction indicator, data information, and signals associated with burst transactions are illustrated. The bar over IBREQ BREQ, BTACK, IBTACK, DTACK, and IDTACK indicates that these signals are active low. The R/W signal is a data direction indication signal where high activates a read transfer and low activates a write transfer. Alternate embodiments may use any scheme or combination of active low and active high, as this does not change the essence of the present invention.

Reading FIG. 6 from the left, the master initiates a burst transaction with assertion of IBREQ signal prior to time $t_1$ which marks the transition to state S0 61. In response to assertion of IBREQ, EBI 4 asserts BREQ and drives address and FC information on external bus 17 by the end of state S0 61 marked by time $t_2$. The slave device responds by asserting BTACK at time $t_3$ during state S3 64. The master requested a read transfer and data is provided by the slave from $t_4$ in a second iteration of state S3 64.

In this timing example, the master decides to terminate the current burst transaction without waiting for completion. EBI 4 receives this information via IBREQ signal at time $t_5$, the beginning of the fourth iteration of state S3, and negates BREQ signal at time $t_6$. Looking at time $t_5$, BTACK remains asserted and therefore data "D4" is transferred from $t_6$. However, data "D4" is the final data transferred in the current burst transaction.

Additionally consider that IBREQ negation at time $t_5$ produced both negation of BREQ during state S4 65, and assertion of IDTACK signal from time $t_6$, continuing through state S5 66. Note that no slave assertion of DTACK is implicated in this example, as EBI 4 generates IDTACK internally.

FIG. 7 is one example of the timing associated with a slave termination of a processing burst transaction for one embodiment of the present invention. Consider that many burst protocols require the slave to transfer a predetermined burst length, and the slave cannot terminate a burst transaction once started. The present invention provides a way for a slave to terminate a burst transaction without transferring the entire burst length. The corresponding states described by bus cycle termination state machine 32 are indicated across the top, where, as in FIG. 6, state "SW" represents a wait state. A clock signal, FC and address information, data direction indicator, data information, and signals associated with burst transactions are illustrated.

Reading FIG. 7 from the left, the master initiates a burst transaction with assertion of IBREQ signal prior to time $t_1$ which marks the transition to state S0 61. In response to assertion of IBREQ, EBI 4 asserts BREQ and drives address and FC information on external bus 17 by the end of state SO 61 marked by time $t_2$. The slave device responds by asserting BTACK at time $t_3$ during state S3 64. The master requested a read transfer and data is provided by the slave from $t_4$ in a second iteration of state S3 64. In this example, BTACK is negated at time $t_5$ resulting in no data tranfer at time $t_6$.

The slave decides to terminate the current burst transaction without continuing to completion. The slave asserts DTACK at time $t_6$ which marks the transition to state S4 65. In response, EBI 4 asserts IDTACK signal during state S4 65. IBREQ is negated during state S5 66, and BREQ negated at time $t_7$ which marks the transition from state S5 66 to state S0 61. Again, one final data transfer, data "D4", occurs after the initial termination request (i.e. slave assertion of DTACK signal before completion of burst transaction.)

FIGS. 6 and 7 illustrate timing associated with read transfers, however the present invention is applicable to write transfers also. Note that allowing both the master and slave to prematurely terminate a burst transaction according to the present invention, eliminates the need for multiple clock cycles typically used in interruption type termination methods.

The present invention adds to the functionality of conventional signals associated with burst transactions by adding definition based on the timing of signal assertion and signal negation. The present invention offers a real time solution to dynamic operation in a data processing environment which is capable of burst transactions.

While one embodiment of the present invention incorporates the state diagram of FIG. 4, alternate embodiments of the present invention may implement other state diagrams or other circuitry, which includes but is not limited to random logic circuitry and clocked logic circuitry.

While the invention has been described in the context of a preferred embodiment, it will be apparent to those skilled in the art that the present invention may be modified in numerous ways and may assume many embodiments other than that specifically set out and described above.

We claim:

1. A method for terminating a burst access across a communication bus in a data processing system, the method comprising the steps of:
   initiating a first burst access to a first region of memory and activating a burst request signal in response;
   determining a burst boundary based on the first burst access and the first region of memory;
   providing a first address on a communication bus;
   keeping said burst request signal active for a first data transfer associated with said first address;
   detecting a request to discontinue said first burst access prior to the burst boundary and deactivating said burst request signal in response; and
   terminating said first burst access after a next adjacent data transfer and before the burst boundary.

2. A method as in claim 1, wherein the step of terminating said first burst access further comprises the step of:
   activating a data acknowledge signal.

3. A method as in claim 1, further comprising the steps of:
   initiating a second burst access to a second region of memory and activating said burst request signal in response;
   providing a second address on said communication bus;
   receiving a first signal to stop said second burst access after a first data transfer associated with said second address and deactivating said burst request signal in response; and
   terminating said second burst access after a next adjacent data transfer associated with said second address.

4. A method as in claim 3, wherein said first region of memory and said second region of memory are a same region of memory.

5. A method as in claim 3, wherein said first signal to stop said second burst access is a data acknowledge signal.

6. A method as in claim 1, wherein said first burst access transfers data from said first address in said region of memory.

7. A method as in claim 1, further comprising the steps of:
   detecting a second burst access to a second region of memory and activating said burst request signal in response;
   providing a data direction signal on said communication bus;
   providing a second address on said communication bus;
   receiving a first data transfer associated with said second address if said data direction signal is asserted;
   providing said first data transfer associated said second address if said data direction signal is negated;
   detecting a reset signal during said second burst access and asserting a data acknowledge signal in response; and
   in response to assertion of said data acknowledge signal, terminating said second burst access if said data direction signal is asserted and continuing said second burst access if said data direction signal is negated.

8. A method as in claim 1, further comprising the steps of:
   detecting a second burst access of a plurality of data transfers to a second region of memory, and activating said burst request signal in response;
   providing a second address on said communication bus;
   initiating a first data transfer associated with said second burst access, said first data transfer is without a preceding data transfer in said second burst access;
   prior to initiating said first data transfer, detecting a request to terminate said second burst access and deactivating said burst request signal in response; and
   terminating said second burst access after said first data transfer.

9. A method as in claim 1, further comprising the steps of:
   detecting a second burst access to a second region of memory and activating said burst request signal in response;

providing a second address on said communication bus;

detecting a request to convert said second burst access into a non burst access;

in response to detecting said request to convert said second burst access, deactivating said burst request signal while a first data transfer associated with said second address is not valid on said communication bus;

processing said first data transfer associated with said second address while said burst request signal is not active; and terminating said second burst access after said first data transfer.

10. A method as in claim 9, wherein said step of terminating said second burst access converts said second burst access into said non burst access.

11. A method as in claim 1, wherein said first burst access has a first burst size and a first data size.

12. A method as in claim 11, where said first burst size and said first data size are programmable.

13. A data processor for performing burst accesses, said data processor comprising:

a central processing unit; and a bus interface unit, said bus interface unit comprising:
a first circuit for providing a burst request signal; and
a second circuit for providing a data acknowledge signal;
wherein in response to receiving a discontinue burst access request prior to a burst boundary, said first circuit negates said burst request signal and said second circuit for providing said data acknowledge signal asserts said data acknowledge signal.

14. A data processor as in claim 13, wherein said first circuit further comprises:

burst assertion circuitry for asserting said burst request signal, said burst assertion circuitry having a stop burst access input;

burst negation circuitry for negating said burst request signal, said burst negation circuitry having an initiate burst access input; and burst request signal generation circuitry for generating said burst request signal, said burst request signal generation circuitry being coupled to said burst negation circuitry and said burst assertion circuitry.

15. A data processor as in claim 14, wherein said second circuit further comprises:

data acknowledge assertion circuitry for asserting said data acknowledge signal, said data acknowledge assertion circuitry having a first input from external and having a second input from said burst negation circuitry;

data acknowledge negation circuitry for negating said data acknowledge signal, said data acknowledge negation circuitry having a third input from external; and data acknowledge generation circuitry for generating said data acknowledge signal, said data acknowledge generation circuitry being coupled to said data acknowledge assertion circuitry and said data acknowledge negation circuitry.

* * * * *